United States Patent
Chhajer et al.

(10) Patent No.: US 12,150,012 B2
(45) Date of Patent: Nov. 19, 2024

(54) ENABLING LOCATION-BASED SERVICES BASED ON GEOFENCE DATA AND PRIVACY SETTINGS

(71) Applicant: Honda Motor Co., Ltd., Tokyo (JP)

(72) Inventors: Rajeev Chhajer, Powell, OH (US); Nithin Santhanam, Columbus, OH (US); Benjamin J Davis, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 17/882,386

(22) Filed: Aug. 5, 2022

(65) Prior Publication Data
US 2024/0048940 A1 Feb. 8, 2024

(51) Int. Cl.
*H04W 4/029* (2018.01)
*G01C 21/34* (2006.01)
*H04W 4/021* (2018.01)

(52) U.S. Cl.
CPC ........ *H04W 4/029* (2018.02); *G01C 21/3476* (2013.01); *H04W 4/021* (2013.01)

(58) Field of Classification Search
CPC ..... H04W 4/029; H04W 4/021; H04W 4/022; H04W 4/40; G01C 21/3476; G01C 21/3811
USPC ...................................... 455/456.3
See application file for complete search history.

(56) References Cited

U.S. PATENT DOCUMENTS

| | | | |
|---|---|---|---|
| 8,255,393 B1 | 8/2012 | Yu et al. | |
| 9,043,222 B1 | 5/2015 | Kerr et al. | |
| 9,215,560 B1 | 12/2015 | Jernigan | |
| 9,386,415 B2 | 7/2016 | Li et al. | |
| 9,547,079 B2 | 1/2017 | Hyatt et al. | |
| 9,720,555 B2 | 8/2017 | Sorden et al. | |
| 9,736,636 B1 | 8/2017 | Deluca et al. | |
| 9,736,685 B2 | 8/2017 | Cai et al. | |
| 9,877,154 B2 | 1/2018 | Shaik | |
| 10,231,084 B2 | 3/2019 | Bagchi et al. | |
| 10,536,570 B2 | 1/2020 | Nalluri et al. | |
| 10,652,694 B2 | 5/2020 | Cornwall et al. | |
| 10,667,081 B2 | 5/2020 | Fox et al. | |

(Continued)

FOREIGN PATENT DOCUMENTS

| | | |
|---|---|---|
| CN | 112383959 A | 2/2021 |
| EP | 2690404 A1 | 1/2014 |

(Continued)

*Primary Examiner* — Tanmay K Shah
(74) *Attorney, Agent, or Firm* — Aaron Fong; American Honda Motor Co., Inc.

(57) ABSTRACT

A system and method for enabling location-based services based on geofence data and privacy settings is provided. The system acquires trip data associated with a vehicle and receives a user input that includes a privacy level associated with the trip data. The system further acquires information that includes a set of geofences corresponding to a set of locations in the trip data. Each geofence of the set of geofences is associated with a rank. The system selects one or more geofences from the set of geofences based on the privacy level and determines, from the trip data, location data that corresponds to the selected one or more geofences. The system filters the trip data by removing the determined location data from the trip data and enables a location-based service based on the filtered trip data.

20 Claims, 6 Drawing Sheets

(56) References Cited

U.S. PATENT DOCUMENTS

| | | |
|---|---|---|
| 10,735,894 B2 | 8/2020 | Ayoub |
| 10,821,887 B1 | 11/2020 | Kemler et al. |
| 10,867,300 B2 | 12/2020 | Unnerstall et al. |
| 10,952,015 B2 | 3/2021 | Kurian |
| 11,122,424 B1 * | 9/2021 | Branscomb ......... H04W 12/033 |
| 2008/0162034 A1 | 7/2008 | Breen |
| 2013/0310053 A1 | 11/2013 | Srivastava et al. |
| 2014/0258201 A1 | 9/2014 | Finlow-Bates |
| 2019/0200162 A1 * | 6/2019 | Cornwall .............. H04W 4/025 |
| 2019/0313204 A1 | 10/2019 | Ayoub et al. |
| 2020/0162836 A1 * | 5/2020 | Beaurepaire ........ G06F 16/9537 |
| 2021/0297807 A1 | 9/2021 | Brady |
| 2021/0400053 A1 | 12/2021 | Jacobson et al. |

FOREIGN PATENT DOCUMENTS

| | | | |
|---|---|---|---|
| EP | 2848021 A1 | 3/2015 | |
| WO | WO-2005088578 A1 * | 9/2005 | ............. G01S 19/14 |
| WO | 2013167793 A1 | 11/2013 | |

\* cited by examiner

ENABLING LOCATION-BASED SERVICES BASED ON GEOFENCE DATA AND PRIVACY SETTINGS

BACKGROUND

Advancements in the field of data analytics and information technology have led to development of various services based on location data of a vehicle. The location data may typically be associated with trips undertaken by a user of the vehicle over a period of time. In many instances, the user may have a privacy concern regarding disclosure and/or use of certain sensitive locations covered or visited during the trips as compared to other locations visited during the trips. Many data aggregators or service providers may collect all the data on the trips to render various services, while simply ignoring or disregarding a data privacy concern of the user.

Limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a system for enabling location-based services based on geofence data and privacy settings is provided. The system may include circuitry that acquires trip data associated with a vehicle and receives a user input that includes a privacy level associated with the trip data. The circuitry may acquire information that includes a set of geofences corresponding to a set of locations in the trip data. Each geofence of the set of geofences may be associated with a rank. The circuitry may select one or more geofences from the set of geofences based on the privacy level and may determine, from the trip data, location data that corresponds to the selected one or more geofences. The circuitry may filter the trip data by removing the determined location data from the trip data and may enable a location-based service based on the filtered trip data.

According to another embodiment of the disclosure, a method for enabling location-based services based on geofence data and privacy settings is provided. The method may include acquiring trip data associated with a vehicle and receiving a user input that includes a privacy level associated with the trip data. The method may further include acquiring information that includes a set of geofences corresponding to a set of locations in the trip data. Each geofence of the set of geofences may be associated with a rank. The method may further include selecting one or more geofences from the set of geofences based on the privacy level and determining, from the trip data, location data that corresponds to the selected one or more geofences. The method may further include filtering the trip data by removing the determined location data from the trip data and enabling a location-based service based on the filtered trip data.

According to another embodiment of the disclosure, a non-transitory computer-readable medium is provided. The non-transitory computer-readable medium may have stored thereon computer implemented instructions that, when executed by a system, causes the system to execute operations. The operations may include acquiring trip data associated with a vehicle and receiving a user input that includes a privacy level associated with the trip data. The operations may further include acquiring information that includes a set of geofences corresponding to a set of locations in the trip data. Each geofence of the set of geofences may be associated with a rank. The operations may further include selecting one or more geofences from the set of geofences based on the privacy level and determining, from the trip data, location data that corresponds to the selected one or more geofences. The operations may further include filtering the trip data by removing the determined location data from the trip data and enabling a location-based service based on the filtered trip data.

Figure 1:
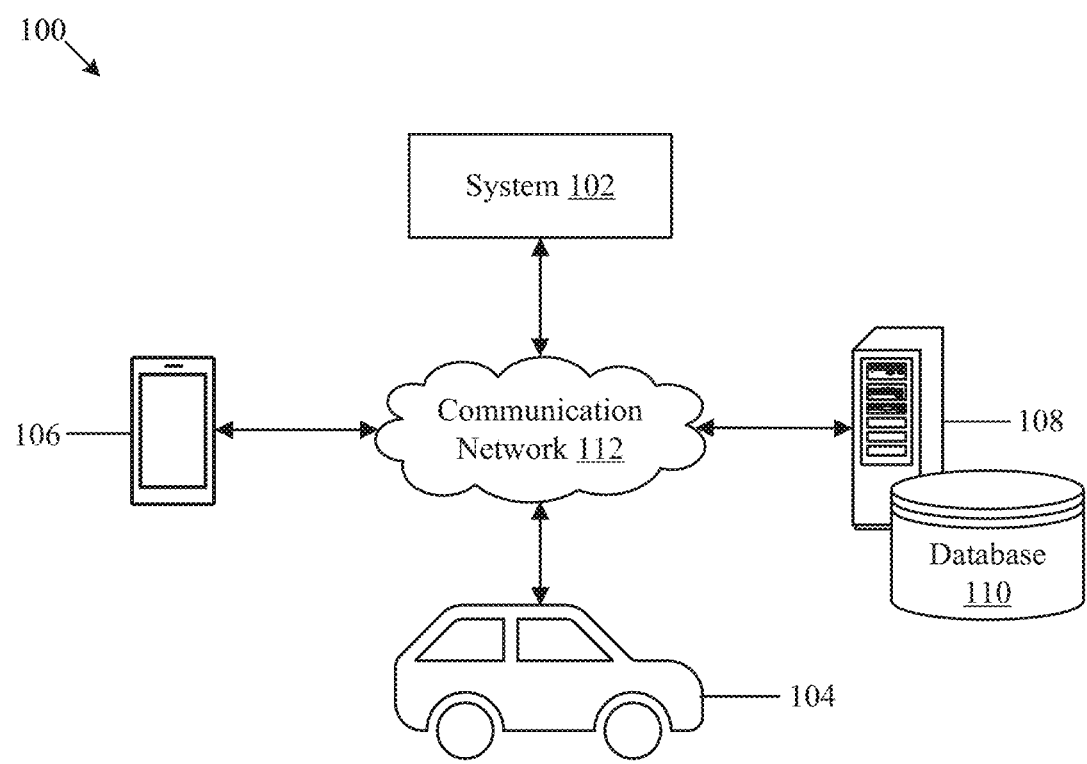
FIG. 1 is a block diagram that illustrates an exemplary network environment for enabling location-based services based on geofence data and privacy settings, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed system and method for enablement of location-based service based on geofence data and user's privacy settings (or sensitivity) for the data. Exemplary aspects of the disclosure may provide a system (such as a computer, a laptop, a mobile phone, smart phone, a server, and so on) that may be configured to acquire trip data (such as start and end points of vehicle trips, a frequency of trips, a time spent at a location, a route followed during a trip, and so on) associated with a vehicle. At any time-instant, the system may receive a user input that includes a privacy level (such as a first level, a second level, a third level, and so on) associated with the trip data. The system may further acquire information that includes a set of geofences corresponding to a set of locations (i.e., significant locations) in the trip data. Each geofence may be associated with a rank. The system may select one or more geofences from the set of geofences, based on the privacy level and may determine, from the trip data, location data that corresponds to the selected one or more geofences. Thereafter, the system may filter the trip data by removing the location data from the trip data and may enable a location-based service (such as a usage-based insurance, a new application, a new advisement, a coupon, a discount, and the like) based on the filtered data.

The disclosed system may monitor a vehicle's geo location data over a time period and may process the data into trip data of a vehicle. The system may compare user's trip/travel information with respect to frequency of travel, trips taken in the duration, start and end locations of trips, and the like. The system may create geofences around significant locations that the user may frequently visit and may spend most of the time. The system may rank such geofences and may use user's preference for a privacy level to filter the trip data. Based on rank and privacy level, the system may remove or filter out part of the trip data in and around certain geofences (of all geofences). For example, if the vehicle is used for travel from office to home on a daily basis, then geofences may be created around the office space and the home location. In furtherance, the system may filter out the trip data associated with the travel by removing locations corresponding to parking locations (i.e., significant locations) in and around the geofences. This may be done so that actual locations of the user or the vehicle cannot be identified. By filtering out sensitive location data, user's safety and data privacy is not compromised. Even if trip-related information (from the filtered trip data) is shared with a third party for activities such as analysis or promotion of any product, the sensitive location data may remain largely unavailable for the activities so as to prevent any misuse of the sensitive location data. Thus, this may improve user's trust in data privacy mechanisms in place for the vehicle and may encourage the user to use the location-based services, without having to worry about the data privacy.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for enabling location-based services based on geofence data and privacy settings, in accordance with an embodiment of the disclosure. With reference to FIG. 1, there is shown a network environment 100. The network environment 100 includes a system 102, a vehicle 104, a mobile device 106, a server 108, and a database 110. The system 102 may communicate with the mobile device 106 and other systems such as the vehicle 104, the server 108, or devices storing the database 110, through a communication network 112.

The system 102 may include suitable logic, circuitry, interfaces, and/or code that may enable location-based services for a user associated with the vehicle 104, based on a filtered version of trip data associated with vehicle 104 and a privacy level associated with the trip data. The filtered version may be obtained by obfuscating or filtering the trip data (e.g., by removing sensitive location data from the trip data). Examples of the system 102 may include, but are not limited to, a computing device, a server, a personal computer such as a laptop, a computer workstation, a tablet device, a smartphone, a cellular phone, a vehicle computer, a consumer electronic (CE) device having a display, a wearable display, or an edge device connected to a user's home network or a vehicle-to-everything (V2X) network.

The vehicle 104 may include an electronic device that may be configured to collect data associated with trips of the vehicle 104. The vehicle 104 may transmit the trip data associated with trips to the server 108 or the system 102, via the communication network 112. For example, the vehicle 104 may include one or more sensors to collect information associated with a usage of the vehicle 104. The information may be collated in the form of a visit dataset (i.e., the trip data) and may include a location of the vehicle 104 at different timestamps within a duration of each trip.

The vehicle 104 may be a non-autonomous vehicle, a semi-autonomous vehicle, or a fully autonomous vehicle, for example, as defined by National Highway Traffic Safety Administration (NHTSA) or Society of Automotive Engineers (SAE) automation levels. Examples of the vehicle 104 may include, but are not limited to, a e-kick scooter, an electric scooter, an electric unicycle, an electric hover board, a skateboard, a roller skate, a four-wheeler vehicle, a three-wheeler vehicle, a two-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. Examples of the four-wheeler vehicle may include, but are not limited to, an electric car, an internal combustion engine (ICE)-based car, a fuel-cell based car, a solar powered-car, or a hybrid car. Similarly, examples of the two-wheeler vehicle may include, but are not limited to, an electric two-wheeler, an internal combustion engine (ICE)-based two-wheeler, or a hybrid two-wheeler. The description of other types of the vehicles has been omitted from the disclosure for the sake of brevity.

The mobile device 106 may include suitable logic, circuitry, and interfaces that may be configured to receive a user input that includes a selection of a privacy level associated with the trip data. The mobile device 106 may transmit the received input to the system 102 or the server 108. For example, the mobile device 106 may be operatively connected with infotainment system, a I/O interface, or a network bus of the vehicle 104. Examples of the mobile device 106 may include, but are not limited to, a personal computer, a laptop, a computer workstation, a tablet device, a smartphone, a cellular phone, a CE device having a display, a wearable display, a head mounted display, or an edge device connected to a user's home network or a user's home network or a V2X network.

The server 108 may include suitable logic, circuitry, interfaces, and/or code that may be configured to receive information associated with the trip data of the vehicle, and a user selection of the privacy level of the vehicle 104. The server 108 may provide the information to the system 102 based on a request received from the system 102. The information may include a set of geofences corresponding to a set of locations in the trip data. Each geofence of the set of geofences may be associated with a rank.

The server 108 may execute operations through web applications, cloud applications, HTTP requests, repository operations, file transfer, and the like. Example implementations of the server 108 may include, but are not limited to, a database server, a file server, a web server, an application server, a mainframe server, a cloud computing server, or a combination thereof. In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the system 102 as two separate entities. In certain embodiments, the functionalities of the server 108 can be incorporated in its entirety or at least partially in the system 102, without a departure from the scope of the disclosure.

The database 110 may include suitable logic, interfaces, and/or code that may be configured to store information associated with trip(s) of the vehicle 104, and information associated with preferences of the user. The database 110 may be a relational, a non-relational database, or a set of comma-separated values (csv) files in conventional or big-data storage. The database 110 may be stored or cached on a device, such as the system 102 or the server 108. The device(s) storing the database 110 may be configured to receive a query for the information associated with the trips of the vehicle 104 and/or the information associated with the privacy preference of the user from the system 102. In response to the received query, the device that stores the database 110 may retrieve and provide the queried information and the information associated with the privacy preference of the user to the system 102.

In some embodiments, the database 110 may be hosted on a plurality of servers stored at same or different locations. The operations of the database 110 may be executed using hardware including a processor, a microprocessor (e.g., to perform or control performance of one or more operations), or an application-specific integrated circuit (ASIC). In some other instances, the database 110 may be implemented using software.

The communication network 112 may include a communication medium through which the system 102, the vehicle 104, the mobile device 106, and the server 108, may communicate with each other. The communication network 112 may be one of a wired connection or a wireless connection. Examples of the communication network 112 may include, but are not limited to, the Internet, a cloud network, a Cellular or Wireless Mobile Network (such as a Long-Term Evolution and 5G New Radio), a Wireless Fidelity (Wi-Fi) network, a Personal Area Network (PAN), a Local Area Network (LAN), or a Metropolitan Area Network (MAN).

Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may acquire trip data associated with the vehicle 104. The trip data may correspond to one or more trips completed using the vehicle 104 and the data may include, for example, a travel time for a trip, a travel route, start and end locations of a trip, a set of visited locations, a time spent at each location, and the like. The trip data may be recorded or observed for a defined time period (such as for certain day(s), week(s), or month(s)). In some instances, the trip data may also include intermediate location(s) in between a start location and an end location of each trip.

At any time-instant, the system 102 may receive a user input that includes a privacy level associated with the trip data. The user may use the infotainment system of the vehicle 104 or the mobile device 106 to select the privacy level. The privacy level may correspond to a level of sensitivity of a location or a geofence around the location for the user associated with the vehicle 104. In some instances, locations where the user may dwell or stay for periods longer than a threshold may be considered as sensitive or significant locations. Typically, start and end locations of the trips may be considered as sensitive or significant locations for the user. User's home or office location may be included in such locations. In accordance with an embodiment, the level of sensitivity may be one of a first level, a second level, or a third level, and may increase from the first level to the second level and from the second level to the third level. In other words, higher the privacy level, higher may be the level of sensitivity.

The system 102 may acquire information that includes a set of geofences corresponding to a set of locations in the trip data. The set of locations may only represent a subset of locations (of the trip data) that may be sensitive or important to user's privacy. In some instances, multiple nearby locations (e.g., different parking locations around a particular place) may be assumed to be one location and then included in the set of locations. Each geofence of the set of geofences may be associated with a rank and a corresponding rank score. Before the acquisition of the information, the set of geofences and corresponding rank scores may be computed based on a trip dataset for the vehicle 104. The computation may be performed based on a dwell time and a visit frequency of the vehicle 104 at any location in the trip dataset. Each rank score may indicate a significance of a corresponding geofence for the user. For example, if the vehicle 104 visits a location frequently and spends ample amount of time, then a time spent at that location and the frequency of visit may be used for calculating the rank of a location (i.e., a significance of a location).

The system 102 may select one or more geofences from the set of geofences, based on the privacy level. For example, if the user selects a privacy level 2, then all geofences that correspond to privacy level 2 may be selected from the set of geofences. Thereafter, from the trip data, the system 102 may determine location data that corresponds to the selected one or more geofences. The system 102 may then filter the trip data by removing the determined location data from the trip data.

The system 102 may enable a location-based service based on the filtered trip data. Examples of the location-based service may include, but are not limited to, a usage-based insurance, a new application, a new advisement, a coupon deal, or a discount offering.

Figure 2:
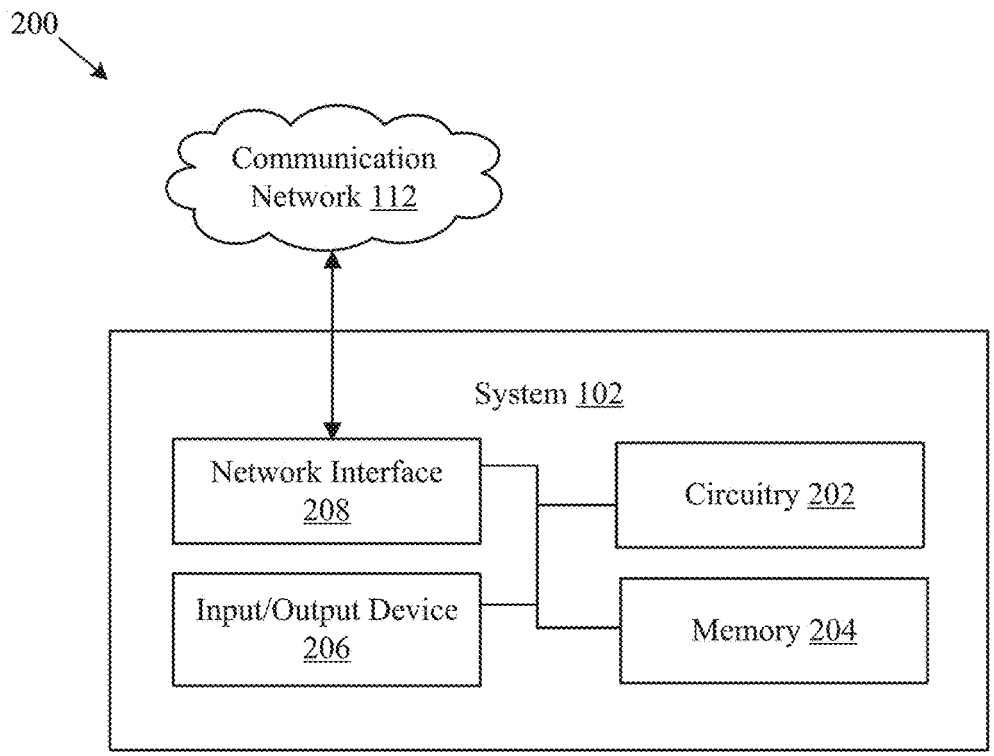
FIG. 2 is a block diagram that illustrates an exemplary system of FIG. 1, in accordance with an embodiment of the disclosure.

FIG. 2 is a block diagram that illustrates an exemplary system of FIG. 1, for enabling location-based services based on geofence data and privacy settings, in accordance with an embodiment of the disclosure. With reference to FIG. 2, there is shown a block diagram 200 of the system 102. The system 102 may include circuitry 202, a memory 204, an input/output (I/O) device 206, and a network interface 208. The circuitry 202 may be communicatively coupled to the memory 204, the I/O device 206, and the network interface 208 through wired or wireless communication of the system 102. Although in FIG. 2, it is shown that the system 102 includes the circuitry 202, the memory 204, the I/O device 206, and the network interface 208; however, the disclosure may not be so limiting, and the system 102 may include less or more components.

The circuitry 202 may include suitable logic, circuitry, and/or interfaces code that may be configured to execute program instructions associated with different operations to be executed by the system 102. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform or direct performance of any number of operations of the system 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the circuitry 202. In at least one embodiment, the memory 204 may be configured to store the determined trip data, a set of geofences corresponding to a set of locations in the trip data, and a trip dataset corresponding to a plurality of trips associated with the vehicle 104. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include one or more input and output devices that may communicate with different components of the system 102. For example, the I/O device 206 may receive user inputs from the participant to trigger initiation of execution of program instructions, by the circuitry 202, associated with different operations to be executed by the system 102. Examples of the I/O device 206 may include, but are not limited to, a touch screen, a keyboard, a mouse, a joystick, a microphone, display device, and a speaker.

The network interface 208 may include suitable logic, circuitry, and interfaces that may be configured to facilitate communication between the circuitry 202, the vehicle 104, the server 108, via the communication network 112. The network interface 208 may be implemented by use of various known technologies to support wired or wireless communication of the server 108 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, a wireless pear-to-pear protocol, a protocol for email, instant messaging, and a Short Message Service (SMS).

The functions or operations executed by the system 102, as described in FIG. 1, may be performed by the circuitry 202. Operations executed by the circuitry 202 are described in detail, for example, in the FIGS. 4A-4B, 5A-5B, and 6.

Figure 3:
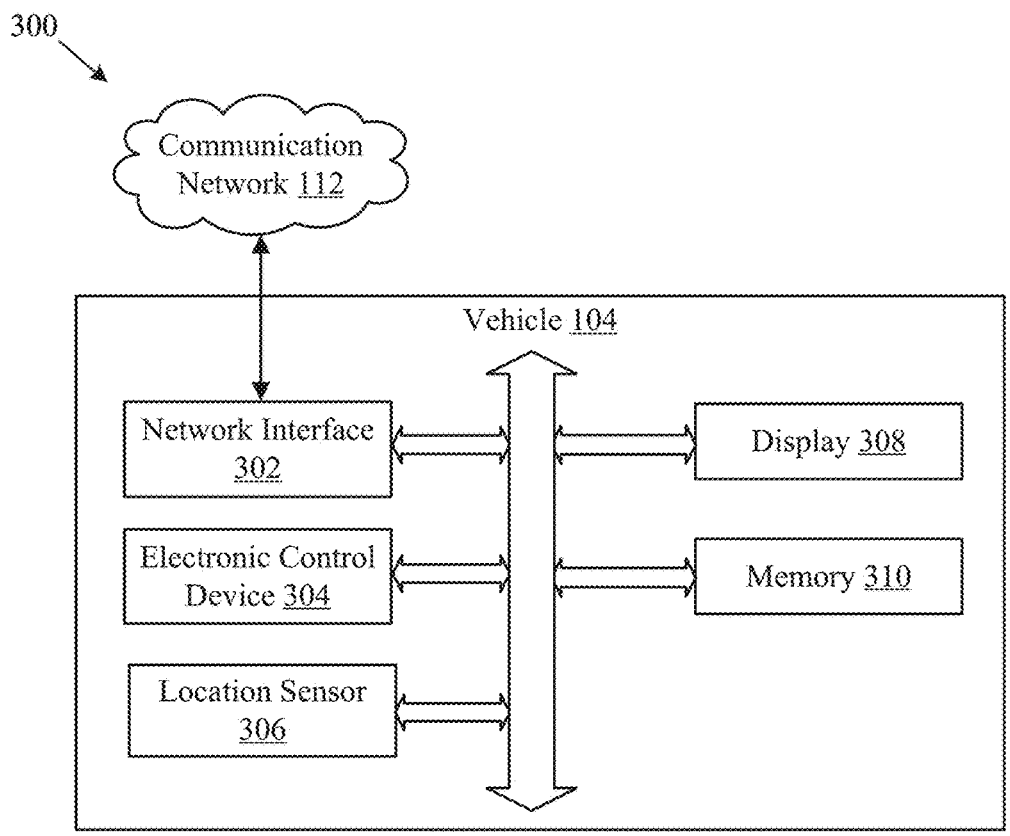
FIG. 3 is a block diagram of an exemplary vehicle of FIG. 1, in accordance with an embodiment of the disclosure.

FIG. 3 is a block diagram of an exemplary vehicle of FIG. 1, in accordance with an embodiment of the disclosure. FIG. 3 is explained in conjunction with elements from FIG. 1 and FIG. 2. With reference to FIG. 3, there is shown a block diagram 300 of the vehicle 104. The vehicle 104 may include a network interface 302, an electronic control device 304, a location sensor 306, a display 308, and a memory 310.

The network interface 302 may include suitable logic, circuitry, and interfaces that may be configured to facilitate communication between the electronic control device 304 and various devices or components of the network environment 100 (such as the system 102, the mobile device 106, or the server 108), via the communication network 112. The network interface 302 may be implemented by use of various known technologies to support wired or wireless communication of the vehicle 104 with the communication network 112. The network interface 302 may include, but is not limited to, an antenna, a RF transceiver, one or more amplifiers, a tuner, one or more oscillators, a digital signal processor, a CODEC chipset, a SIM card, or a local buffer circuitry. The network interface 302 may be configured to communicate via wireless communication with networks, such as the Internet, an Intranet or a wireless network, such as a cellular telephone network, a wireless LAN, and a MAN. The wireless communication may be configured to use one or more of a plurality of communication standards, protocols and technologies, such as GSM, EDGE, W-CDMA, LTE, 5G NR, CDMA, TDMA, Bluetooth, Wi-Fi (such as IEEE 802.11a, IEEE 802.11b, IEEE 802.11g or IEEE 802.11n), VoIP, Li-Fi, Wi-MAX, a protocol for email, instant messaging, and a SMS.

The electronic control device 304 may include suitable logic, circuitry, interfaces, and/or code that may be configured to monitor a usage of the vehicle 104 by the user. The electronic control device 304 may be a specialized electronic circuitry that may include an electronic control unit (ECU) processor to control different functions, such as, but not limited to, engine operations, communication operations, and data acquisition of the vehicle 104. The electronic control device 304 may be configured to control operation of location sensor 306 to determine a precise location of the vehicle 104 at different time-instants, monitor speed of the vehicle, and determine a time period for which the vehicle 104 is in a parked state. The electronic control device 304 may transmit the determined location and other related parameters to the system 102. The electronic control device 304 may be a microprocessor. Other examples of the electronic control device 304 may include, but are not limited to, a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable CE device, a server, and other computing devices.

The location sensor 306 may include suitable logic, circuitry, and/or interfaces that may be configured to determine a current geo-location of the vehicle 104. The location sensor 306 may be configured to determine a set of geolocations visited by the vehicle 104 within a certain time period. Examples of the location sensor 306 may include, but are not limited to, a Global Navigation Satellite System (GNSS)-based sensor or an Inertial Measurement Unit (IMU) of the vehicle 104. Examples of the GNSS-based sensor may include, but are not limited to, global positioning sensor (GPS), Global Navigation Satellite System (GLONASS), or other regional navigation systems or sensors.

In accordance with an embodiment, the vehicle 104 may include a speed sensor to sense a speed of the vehicle 104. The speed may be determined based on a linear displacement of the vehicle 104 or an angular displacement of a front wheel of the vehicle 104. Example of the speed sensor may include, but are not limited to, Hall effect sensors, variable reluctance speed sensors, Radio Frequency (RF) speed sensors, amplified (Active) speed sensors, Light Detection and Ranging (LiDAR) speed sensors, accelerometer-based speed sensors, optical speed sensors, and Antilock Braking System (ABS) speed sensors. In some embodiments, the speed sensor may detect the speed based on engine revolutions, gear ratio, wheel rotation, and the like. Though not shown in FIG. 3, the vehicle 104 may further include an odometer to determine a distance that the vehicle 104 may cover in a certain time period. In certain embodiments, the odometer may be integrated with the speed sensor.

The vehicle 104 may further include a real time clock. The real-time clock may include suitable logic, circuitry, interfaces, and/or code that may be configured to determine a current date-time (i.e., a timestamp) for a geolocation of the vehicle 104. Examples of the real-time clock may include, but are not limited to, a crystal-based clock, a computer clock, and a radio-based clock.

The display 308 may include infotainment system of the vehicle 104. The display 308 may be a touch enabled input/output system that may facilitate the user in interactions with the vehicle and/or system 102. The display 308 may enable the user to select and or reconfigure the privacy level. For example, the user may select a privacy level or may change a previously selected privacy level. Further, the display 308 may facilitate in configuring, selecting and displaying location-based services (such as usage-based insurance, new application, new advisement, coupons, discounts, and the like) based on filtered trip data. The display device 212 may be realized through several known technologies such as, but not limited to, at least one of a Liquid Crystal Display (LCD) display, a Light Emitting Diode (LED) display, a plasma display, or an Organic LED (OLED) display technology, or other display devices.

The memory 310 may include suitable logic, circuitry, interfaces, and/or code that may be configured to store the set of instructions executable by the electronic control device 304. Examples of implementation of the memory 204 may include, but are not limited to, RAM, ROM, a HDD, an SSD, a CPU cache, and/or a SD card.

Figure 4A:
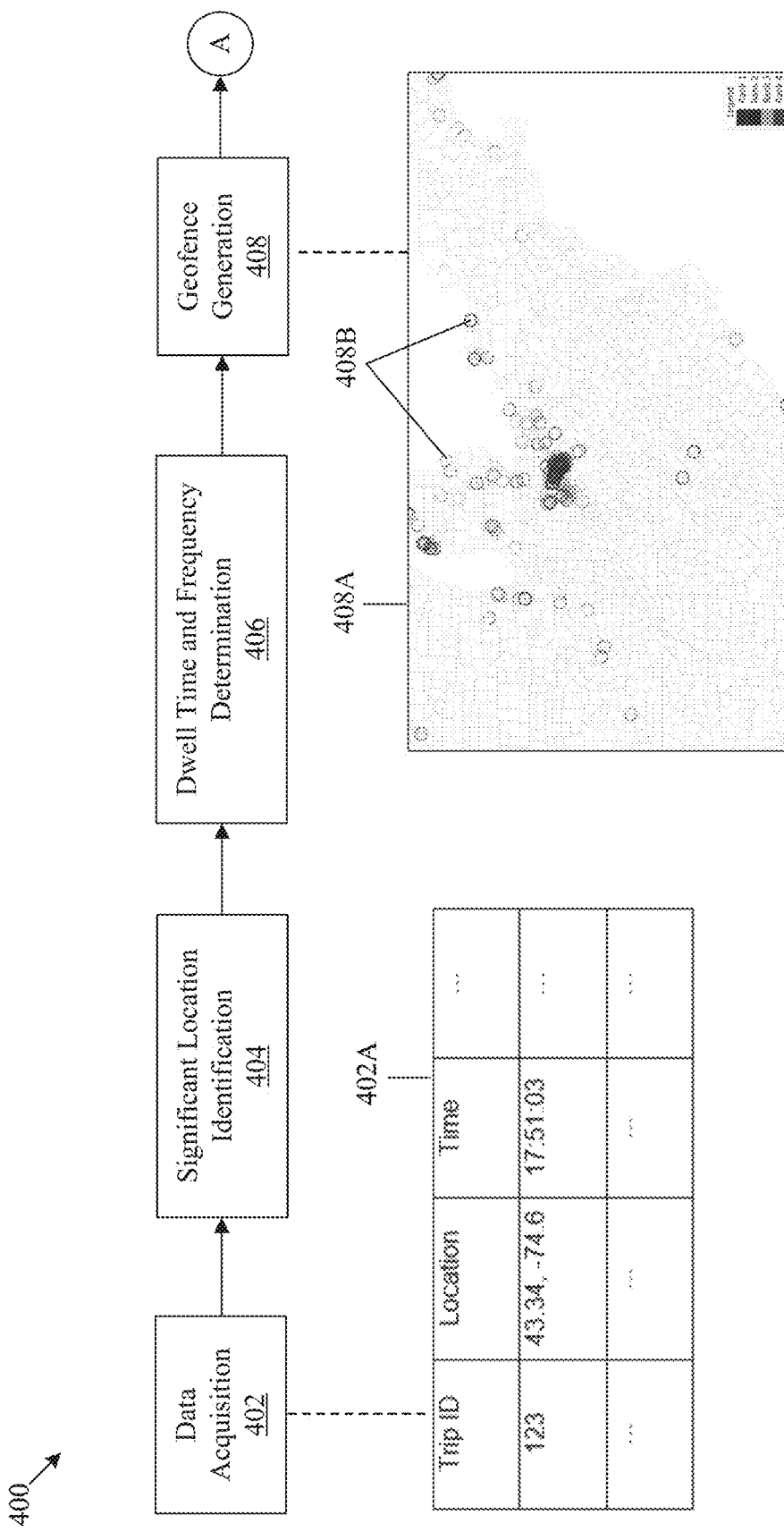
FIGS. 4A-4B are diagrams that collectively illustrate an exemplary execution pipeline for rank score computation and rank association based on a trip dataset, in accordance with an embodiment of the disclosure.
Figures 4B, 5A:
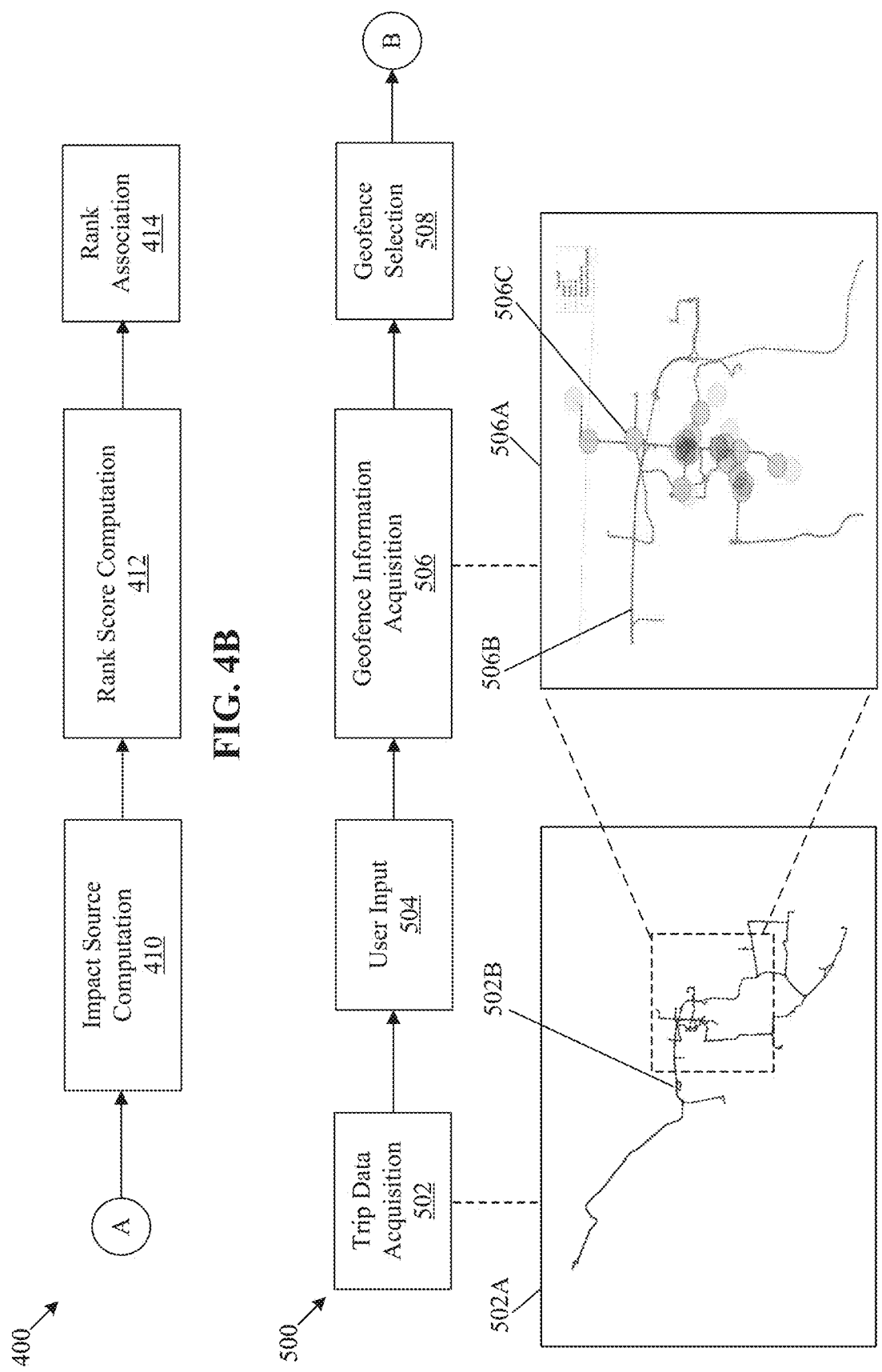
FIGS. 5A-5B are diagrams that collectively illustrate an exemplary execution pipeline for filtering sensitive location data based on geofence data and privacy settings, in accordance with an embodiment of the disclosure.

FIGS. 4A-4B are diagrams that collectively illustrate an exemplary execution pipeline for rank score computation and rank association based on a trip dataset, in accordance with an embodiment of the disclosure. FIGS. 4A-4B are explained in conjunction with elements from FIG. 1, FIG. 2, and FIG. 3. With reference to FIGS. 4A-4B, there is shown an exemplary execution pipeline 400. The exemplary execution pipeline 400 may include a set of operations from 402 to 414 that may be executed by one or more components of FIG. 1, such as the system 102. The set of operations may be performed by the system 102 to generate a set of geofences and corresponding rank scores, as described herein.

At 402, a trip dataset 402A may be acquired. The system 102 may acquire the trip dataset 402A. The acquired trip dataset 402A may correspond to a plurality of trips associated with the vehicle 104. The trip dataset may be acquired from a summary of mobility trip data of the vehicle 104 over a historical time period (e.g., a year or a set of months) and may include locations (includes start and end locations) included in trip routes covered using the vehicle 104.

At 404, a set of locations (i.e., a set of significant locations) may be identified from the trip dataset 402A. The system 102 may identify the set of locations from the trip dataset 402A. For such identification, the system 102 may extract a plurality of locations from the trip dataset 402A. The extracted locations may correspond to start and end points of the plurality of trips. Typically, the locations from where the vehicle 104 may have started a trip or ended a trip indicate that the user must have resided around such locations for a period of time and that the locations may be significant. Thereafter, the system 102 may identify a set of location clusters from the extracted plurality of locations, based on a distance metric (such as L2 distance). The set of locations (i.e., the set of significant locations) may be identified based on a selection of a location from each location cluster of the set of location clusters. For example, the plurality of locations may be snapped to a grid so that any start or end points that may be very close to each other (i.e., within a threshold distance) may be combined as one location point to obtain the set of locations.

At 406, a dwell time and a visit frequency for each location of the set of locations may be determined. The system 102 may determine the dwell time and visit frequency for each location (i.e., each significant location), based on the trip dataset 402A. In accordance with an embodiment, the dwell time may be an average duration for which the user may stay in a location (i.e., a significant location) and the visit frequency may indicate a number of times the user may have visited that location.

At 408, a set of geofences may be generated. The system 102 may generate the set of geofences corresponding to the identified set of locations (i.e., significant locations). For example, a geofence may be generated for a significant location based on the dwell time and the visit frequency. An example of a map 408A with a set of geofences 408B as a set of circular graphic overlays is shown over multiple route locations.

At 410, a set of impact scores may be computed. The system 102 may compute the set of impact scores corresponding to each location of the identified set of locations, based on a significance of the dwell time or a significance of the visit frequency for each location of the set of locations.

In some instances, the dwell time and the visit frequency may be analyzed relative to datapoints such as the vehicle's own significant locations (i.e., a significance of a location for the vehicle) and significant locations of all vehicles (i.e., a significance of one location relative to all vehicle significant locations). Using such datapoints, the set of impact scores (also referred to as partial impact scores) may be generated. For example, for each location of the set of locations, the set of impact scores may include a relative dwell impact score, a relative frequency impact score, an absolute dwell impact score, and an absolute frequency impact score. The relative dwell impact score may measure a significance of a location in relation to the vehicle's dwell time at other significant locations. The relative frequency impact score may measure a significance of a location in relation to vehicle's visit frequencies at other significant locations. The absolute dwell impact score may measure a significance of a location in relation to dwell times of all significant locations (i.e., the set of locations). The absolute frequency impact score may measure a significant of a location in relation to visit frequencies of all significant locations (i.e., the set of locations). By way of example, and not limitation, the relative dwell impact score, the relative frequency impact score, the absolute dwell impact score, and the absolute frequency impact may be 0.15, 0.15, 0.35, and 0.35, respectively, for a location 'A'. In this case, absolute impact scores may be weighed more than relative scores.

At 412, a set of rank scores may be computed. The system 102 may compute the set of rank scores corresponding to the set of geofences. The set of geofences may correspond to the set of significant locations (i.e. locations identified at 404). The computation may be performed based on the dwell time and the visit frequency of the vehicle 104 at the location. Each score of the computed set of scores may indicate a significance of a corresponding geofence of the set of geofences for the user associated with the plurality of trips. In accordance with an embodiment, each rank score of the set of rank scores may be computed based on a weighted combination of the set of impact scores (computed at 410) for a corresponding location of the set of locations.

At 414, a rank may be associated with each geofence of the set of geofences. The system 102 may associated the rank with each geofence, based on the set of rank scores (computed at 412). In an embodiment, the system 102 may identify, from a set of score ranges, a score range (e.g., a percentile boundary) which includes a rank score for a corresponding geofence of the set of geofences. Each geofence of the set of geofences may be associated with the rank further based on the score range identified for a corresponding geofence of the set of geofences. The higher the rank, the greater the significance of a geofence with that rank.

Figure 5B:
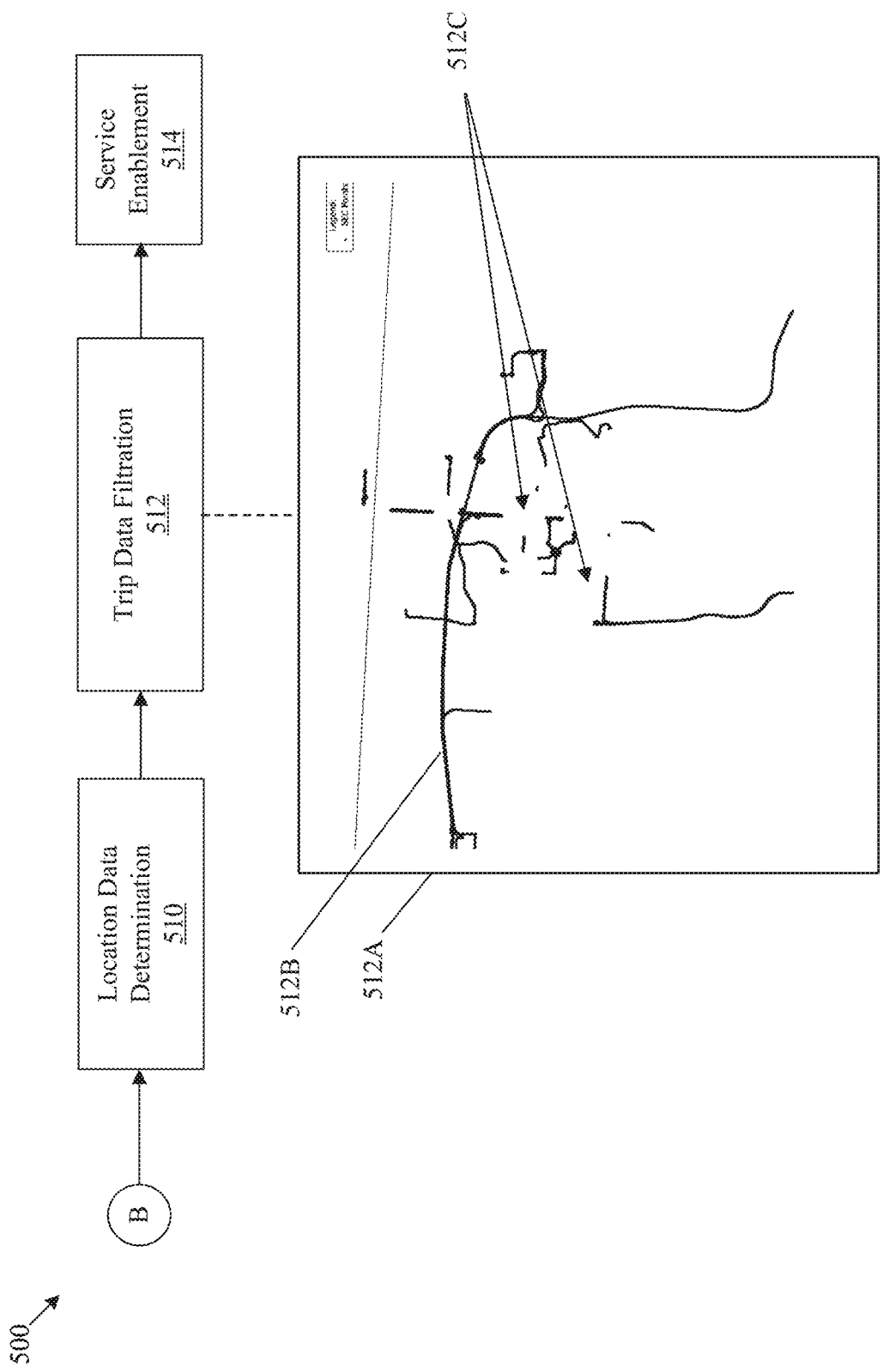

FIGS. 5A-5B are diagrams that collectively illustrate an exemplary execution pipeline for filtering sensitive location data based on geofence data and privacy settings, in accordance with an embodiment of the disclosure. FIGS. 5A-5B are explained in conjunction with elements from FIG. 1, FIG. 2, FIGS. 3, and 4A-4B. With reference to FIGS. 5A-5B, there is shown an exemplary execution pipeline 500. The exemplary execution pipeline 500 may include a set of operations from 502 to 514 that may be executed by one or more components of FIG. 1, such as the system 102. The set of operations may be performed by the system 102 to apply the set of geofences (e.g., the set of geofences 408B of FIG. 4A) to incoming vehicle trip data for the same vehicle (i.e., the vehicle 104) and filter sensitive location data in or around some of the geofences from the trip data, as described herein.

At 502, trip data associated with the vehicle 104 may be acquired. An example of a map 502A is shown in FIG. 5A to indicate a route 502B with locations of the trip data. In accordance with an embodiment, the trip data may be acquired by use of a set of sensors included in the vehicle 104. For example, the set of sensors may include a location sensor (such as the location sensor 306), a speed sensor, and a real time clock (as described in FIG. 3).

At 504, a user input may be received. The system 102 may receive the user input that includes or indicates a privacy level associated with the trip data. In accordance with an embodiment, the mobile device 106 or a display of the vehicle 104 may include a setting UI (not shown) for data privacy. The user may select the privacy level from a set of privacy levels via the setting UI. In accordance with an embodiment, the privacy level may be selected via the setting UI in response to a prompt to update the data privacy for the trip data. For the user associated with the vehicle 104, the privacy level may indicate a level of sensitivity of a location or a geofence around the location. By way of example, and not limitation, the privacy level may be one of a first level, a second level, or a third level. The level of sensitivity may increase from the first level to the second level and from the second level to the third level.

At 506, information that includes the set of geofences may be acquired. The system 102 may acquire the information that includes the set of geofences corresponding to the set of locations of the trip data. The generation of the set of geofences and rank association are described, for example, in FIGS. 4A-4B. Each geofence of the set of geofences may be associated with a rank. For example, the rank may be one of four ranks (i.e., rank 1, rank 2, rank 3, or rank 4) associated with the set of geofences. As an example, a map 506A is shown with trip routes 506B and geofences 506C. The geofences 506C may correspond to significant locations from which geofence(s) of the rank 4 (represented by dark shade circles) correspond to most significant locations and geofences of the rank 1 correspond to least significant locations (represented by light shade circles).

At 508, one or more geofences may be selected from the set of geofences. The system 102 may select the one or more geofences from the set of geofences, based on the privacy level. For example, if the user selects a privacy level 2, then all the geofences with ranks that correspond to the privacy level 2 may be selected.

At 510, location data that corresponds to the selected one or more geofences may be determined. The system 102 may determine the location data from the trip data. The size of the location data may increase with an increase in the privacy level. For example, privacy levels (from 1 to 3) may correspond to obfuscation options such as a light obfuscation, a heavy obfuscation, or a full obfuscation. If the first level is specified in the user input, then the light obfuscation option may be used to select the location data that includes the most significant locations (e.g., locations inside the geofence(s) with the rank 4 of the set of geofences). If the second level is specified in the user input, then the heavy obfuscation option may be used to select the location data that includes the most significant locations (e.g., locations inside the geofence(s) with the ranks 3 and 4) and mildly significant locations (e.g., locations inside the geofence(s) with the rank 2). If the third level is specified in the user input, then the full obfuscation option may be used to select the location data around all significant locations and including all the significant locations (e.g., locations in and around the geofence(s) with the ranks 1,2,3, and 4).

At 512, the trip data may be filtered by removing the determined location data from the trip data. The system 102 may remove or filter out part of the trip data in and/or around the selected one or more geofences using the determined location data. As an example, a map 512A is shown with filtered locations 512B of the filtered trip data. Location data that may be removed from original trip routes (shown in 502A) is represented by regions 512C of the map 512A. The map 512A represents an example of trip data filtration when the third privacy level (i.e., level 3 or a full obfuscation option) is selected. In such a case, all the significant locations may be removed from the trip data.

In an example scenario, if the vehicle 104 is used for travel from office to home on a daily basis, then geofences may be generated around the office space and the home location. In furtherance, the system 102 may filter out the trip data associated with the travel from office to home by removing locations corresponding to parking locations (i.e., significant locations) in or around the geofences. This may be done so that actual locations of the user or the vehicle cannot be identified. By filtering out sensitive location data, user's safety and data privacy is not compromised. Even if trip-related information (from the filtered trip data) is shared with a third party for activities such as analysis or promotion of any product, the sensitive location data may remain largely unavailable for the activities so to prevent any misuse of the sensitive location data. Thus, this may improve user's trust in data privacy mechanisms in place for the vehicle 104 and may encourage the user to use the location-based services, without having to worry about the data privacy.

At 514, location-based service(s) may be enabled. The system 102 may enable the location-based service (such as a usage-based insurance, a new application, a new advisement, a coupon, a discount, and the like) based on the filtered trip data.

Figure 6:
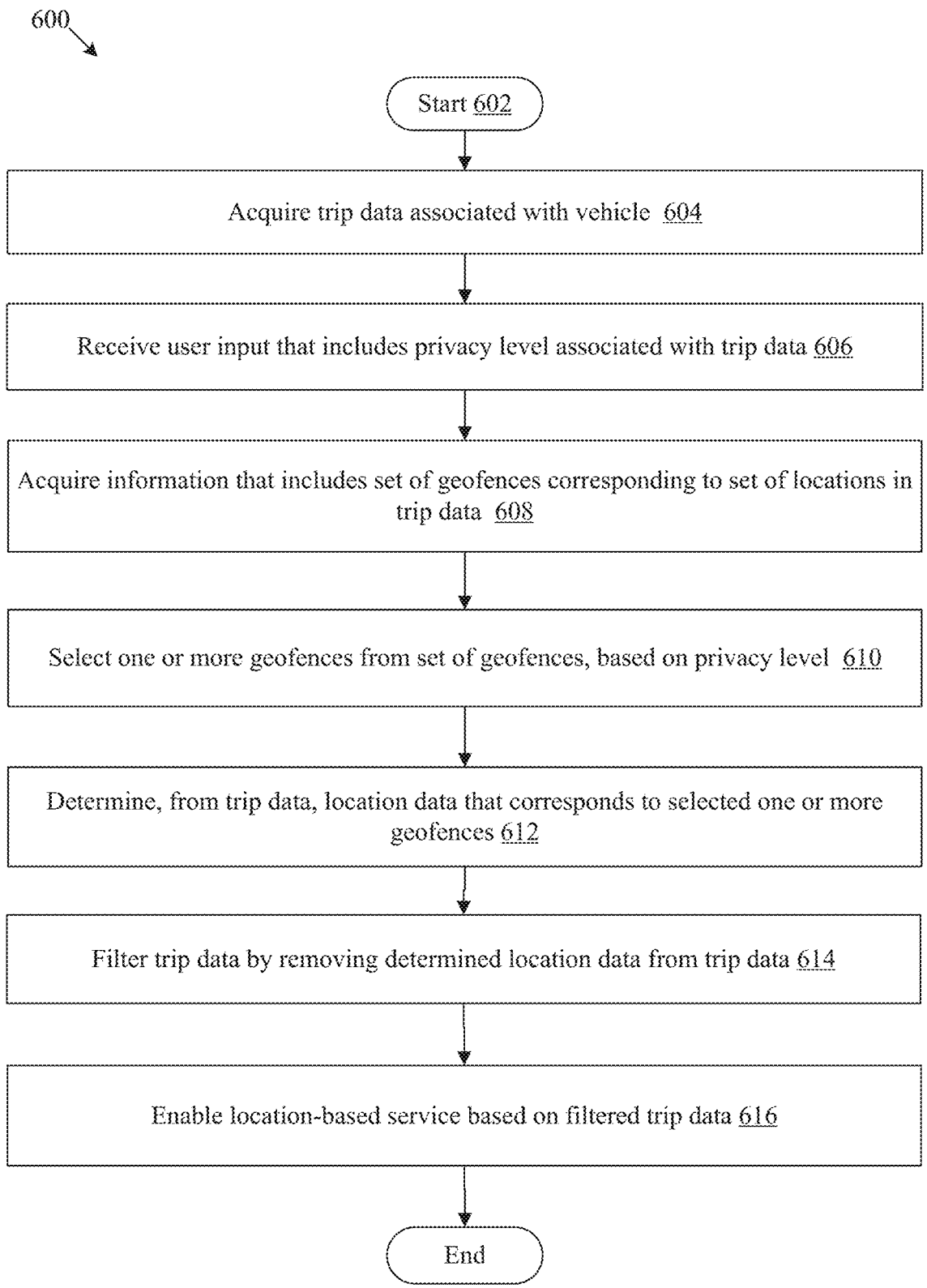
FIG. 6 is a flowchart that illustrates exemplary operations for enabling location-based services based on geofence data and privacy settings, in accordance with an embodiment of the disclosure.

FIG. 6 is a flowchart that illustrates exemplary operations for enabling location-based services based on geofence data and privacy settings, in accordance with an embodiment of the disclosure. FIG. 6 is explained in conjunction with elements from FIG. 1, FIG. 2, FIG. 3, FIGS. 4A-4B, and FIGS. 5A-5B. With reference to FIG. 6, there is shown a flowchart 600. The flowchart 600 is described in conjunction with FIGS. 1, 2, 3, 4A-4B, and 5A-5B. The operations from 604 to 616 may be implemented, for example, by the system 102 of FIG. 1 or the circuitry 202 of FIG. 2. The operations of the flowchart 600 may start at 602 and proceed to 604.

At 604, trip data associated with the vehicle 104 may be acquired. The system 102 may acquire the trip data (such as a travel time for a trip, a travel route, start and end locations of the trip, visited locations, or a time spent at a location), associated with the vehicle 104. The trip data may be recorded or observed for a defined time period such as, for certain day(s), week(s), or month(s)).

At 606, a user input that includes a privacy level associated with the trip data may be received. The system 102 may receive the user input that includes the privacy level associated with the trip data.

At 606, information that includes a set of geofences corresponding to a set of locations in the trip data may be acquired. The system 102 may acquire the information that includes the set of geofences. Each geofence of the set of geofences may be associated with a rank.

At 610, one or more geofences may be selected from the set of geofences. The system 102 may select the one or more geofences from the set of geofences, based on the privacy level.

At 612, location data that corresponds to the selected one or more geofences may be determined. The system 102 may determine, from the trip data, location data that corresponds to the selected one or more geofences.

At 614, the trip data may be filtered by removing the determined location data from the trip data. The system 102 may filter the trip data by removing the determined location data from the trip data.

At 616, a location-based service may be enabled based on the filtered trip data. The system 102 may enable the location-based service based on the filtered trip data.

Although the flowchart 600 is illustrated as discrete operations, such as 604, 606, 608, 610, 612, 614, and 616, the disclosure may not be so limiting. In certain embodiments, such discrete operations may be further divided into additional operations, combined into fewer operations, or eliminated, depending on the implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as the system 102) for enabling location-based services based on geofence data and privacy settings. The operations may include acquiring trip data associated with a vehicle and receiving a user input that includes a privacy level associated with the trip data. The operations may further include acquiring information that includes a set of geofences corresponding to a set of locations in the trip data. Each geofence of the set of geofences may be associated with a rank. The operations may further include selecting one or more geofences from the set of geofences based on the privacy level and determining, from the trip data, location data that corresponds to the selected one or more geofences. The operations may further include filtering the trip data by removing the determined location data from the trip data and enabling a location-based service based on the filtered trip data.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the embodiment disclosed, but that the present disclosure will include all embodiments that fall within the scope of the appended claims.

What is claimed is:

1. A system, comprising:
   circuitry that:
   acquires trip data associated with a vehicle;
   receives a user input that includes a privacy level associated with the trip data;
   acquires information that includes a set of geofences corresponding to a set of locations in the trip data, wherein each geofence of the set of geofences is associated with a rank;
   selects one or more geofences from the set of geofences, based on the privacy level;
   determines, from the trip data, location data that corresponds to the selected one or more geofences;
   filters the trip data by removing the determined location data from the trip data; and
   enables a location-based service based on the filtered trip data.

2. The system according to claim 1, wherein the circuitry further:
   acquires a trip dataset corresponding to a plurality of trips associated with the vehicle;
   identifies the set of locations from the trip dataset;
   determines a dwell time and a visit frequency for each location of the set of locations, based on the trip dataset; and
   generates the set of geofences corresponding to the set of locations.

3. The system according to claim 2, wherein the circuitry further:
   extracts, from the trip dataset, a plurality of locations corresponding to start and end points of the plurality of trips; and
   identifies a set of location clusters from the plurality of locations, based on a distance metric,
   wherein the set of locations are identified based on a selection of a location from each location cluster of the set of location clusters.

4. The system according to claim 2, wherein the circuitry further:
   computes a set of rank scores corresponding to the set of geofences, based on the dwell time and the visit frequency,
   wherein each score of the computed set of scores indicates a significance of a corresponding geofence of the set of geofences for a user associated with the plurality of trips; and
   associates the rank with each geofence of the set of geofences, based on the set of rank scores.

5. The system according to claim 4, wherein the circuitry further computes a set of impact scores corresponding to each location of the identified set of locations, based on a significance of the dwell time or a significance of the visit frequency for each location of the set of locations, and
   wherein each rank score of the set of rank scores is computed further based on a weighted combination of the set of impact scores for a corresponding location of the set of locations.

6. The system according to claim 4, wherein the circuitry further identifies, from a set of score ranges, a score range which includes a rank score for a corresponding geofence of the set of geofences, and
   wherein each geofence of the set of geofences is associated with the rank further based on the score range identified for a corresponding geofence of the set of geofences.

7. The system according to claim 1, wherein the privacy level indicates a level of sensitivity of a location or a geofence for a user associated with the vehicle and is one of a first level, a second level, or a third level.

8. The system according to claim 7, wherein the level of sensitivity increases from the first level to the second level and from the second level to the third level.

9. The system according to claim 1, wherein a size of the location data for the removal increases with an increase in the privacy level.

10. A method, comprising:
    acquiring trip data associated with a vehicle;
    receiving a user input that includes a privacy level associated with the trip data;
    acquiring information that includes a set of geofences corresponding to a set of locations in the trip data, wherein each geofence of the set of geofences is associated with a rank;
    selecting one or more geofences from the set of geofences, based on the privacy level;
    determining, from the trip data, location data that corresponds to the selected one or more geofences;
    filtering the trip data by removing the determined location data from the trip data; and
    enabling a location-based service based on the filtered trip data.

11. The method according to claim 10, further comprising:
    acquiring a trip dataset corresponding to a plurality of trips associated with the vehicle;
    identifying the set of locations from the trip dataset;
    determining a dwell time and a visit frequency for each location of the set of locations, based on the trip dataset; and
    generating the set of geofences corresponding to the set of locations.

12. The method according to claim 11, further comprising:
    extracting, from the trip dataset, a plurality of locations corresponding to start and end points of the plurality of trips; and
    identifying a set of location clusters from the plurality of locations, based on a distance metric,
    wherein the set of locations are identified based on a selection of a location from each location cluster of the set of location clusters.

13. The method according to claim 11, further comprising:
    computing a set of rank scores corresponding to the set of geofences, based on the dwell time and the visit frequency,
    wherein each score of the computed set of scores indicates a significance of a corresponding geofence of the set of geofences for a user associated with the vehicle; and
    associating the rank with each geofence of the set of geofences, based on the set of rank scores.

14. The method according to claim 13, further comprising computing a set of impact scores corresponding to each location of the identified set of locations, based on a significance of the dwell time or a significance of the visit frequency for each location of the set of locations, and
wherein each rank score of the set of rank scores is computed further based on a weighted combination of the set of impact scores for a corresponding location of the set of locations.

15. The method according to claim 13, further comprising identifying, from a set of score ranges, a score range which includes a rank score for a corresponding geofence of the set of geofences, and
wherein each geofence of the set of geofences is associated with the rank further based on the score range identified for a corresponding geofence of the set of geofences.

16. A non-transitory computer-readable medium having stored thereon computer implemented instructions that, when executed by a system, causes the system to execute operations, the operations comprising:
acquiring trip data associated with a vehicle;
receiving a user input that includes a privacy level associated with the trip data;
acquiring information that includes a set of geofences corresponding to a set of locations in the trip data, wherein each geofence of the set of geofences is associated with a rank;
selecting one or more geofences from the set of geofences, based on the privacy level;
determining, from the trip data, location data that corresponds to the selected one or more geofences;
filtering the trip data by removing the determined location data from the trip data; and
enabling a location-based service based on the filtered trip data.

17. The non-transitory computer-readable medium according to claim 16, wherein the operations further comprise:
acquiring a trip dataset corresponding to a plurality of trips associated with the vehicle;
identifying the set of locations from the trip dataset;
determining a dwell time and a visit frequency for each location of the set of locations, based on the trip dataset; and
generating the set of geofences corresponding to the set of locations.

18. The non-transitory computer-readable medium according to claim 17, wherein the operations further comprise
extracting, from the trip dataset, a plurality of locations corresponding to start and end points of the plurality of trips; and
identifying a set of location clusters from the plurality of locations, based on a distance metric,
wherein the set of locations are identified based on a selection of a location from each location cluster of the set of location clusters.

19. The non-transitory computer-readable medium according to claim 17, wherein the operations further comprise:
computing a set of rank scores corresponding to the set of geofences, based on the dwell time and the visit frequency,
wherein each score of the computed set of scores indicates a significance of a corresponding geofence of the set of geofences for a user associated with the vehicle; and
associating the rank with each geofence of the set of geofences, based on the set of rank scores.

20. The non-transitory computer-readable medium according to claim 19, wherein the operations further comprise identifying, from a set of score ranges, a score range which includes a rank score for a corresponding geofence of the set of geofences, and
wherein each geofence of the set of geofences is associated with the rank further based on the score range identified for a corresponding geofence of the set of geofences.

* * * * *